(12) United States Patent
Akhter et al.

(10) Patent No.: US 8,218,561 B2
(45) Date of Patent: Jul. 10, 2012

(54) FLOW REDIRECTION EMPLOYING STATE INFORMATION

(75) Inventors: Aamer Saeed Akhter, Cary, NC (US);
Arivu Mani Ramasamy, San Jose, CA (US); Paul J. Aitken, Pebblesshire (GB); Mark Gillott, Newcastle (GB)

(73) Assignee: Cisco Technology, Inc., San Jose, CA (US)

( * ) Notice: Subject to any disclaimer, the term of this patent is extended or adjusted under 35 U.S.C. 154(b) by 436 days.

(21) Appl. No.: 12/430,312

(22) Filed: Apr. 27, 2009

(65) Prior Publication Data

US 2010/0271964 A1  Oct. 28, 2010

(51) Int. Cl.
*H04L 12/28* (2006.01)
*H04L 12/56* (2006.01)
(52) U.S. Cl. ..................................................... 370/419
(58) Field of Classification Search .................. 370/419
See application file for complete search history.

(56) References Cited

U.S. PATENT DOCUMENTS

| | | | | |
|---|---|---|---|---|
| 5,687,717 | A * | 11/1997 | Halpern et al. | 600/300 |
| 6,240,461 | B1 | 5/2001 | Cieslak et al. | |
| 6,683,873 | B1 | 1/2004 | Kwok et al. | |
| 7,062,571 | B1 | 6/2006 | Dale et al. | |
| 7,088,718 | B1 | 8/2006 | Srivastava | |
| 7,349,979 | B1 | 3/2008 | Cieslak et al. | |
| 2003/0195919 | A1* | 10/2003 | Watanuki et al. | 709/105 |
| 2005/0198238 | A1* | 9/2005 | Sim et al. | 709/222 |
| 2006/0130064 | A1 | 6/2006 | Srivastava | |
| 2006/0235997 | A1* | 10/2006 | Munirajan et al. | 709/245 |
| 2008/0101233 | A1* | 5/2008 | Shi et al. | 370/235 |
| 2008/0159141 | A1* | 7/2008 | Soukup et al. | 370/235 |
| 2011/0096664 | A1* | 4/2011 | Petry et al. | 370/231 |

OTHER PUBLICATIONS

L. Kencl and J.L. Boudec, "Adaptive Load Sharing for Network Processors", in Proc. INFOCOM, 2002.*
Cisco Technology Administration, "Web Cache Communication Protovol V2.0", Cieslak et al., Jan. 21, 2009.
Cisco Technology Administration, "Introduction to Cisco IOS NetFlow", Oct. 2007.
Cisco Technology Administration, "Introduction to Cisco IOS Flexible NetFlow", Sep. 2008.
Cisco Technology Administration, "GLBP—Gateway Load Balancing Protocol", p. 1-42.
David Davis, "Cisco administration 101: Monitor network traffic with NetFlow", Jul. 16, 2008.

* cited by examiner

*Primary Examiner* — Ayaz Sheikh
*Assistant Examiner* — Tarell Hampton
(74) *Attorney, Agent, or Firm* — Tucker Ellis LLP

(57) ABSTRACT

In an example embodiment, there is disclosed an apparatus comprising a first interface configured to receive a packet from a client, a second interface configured to transmit the packet to a server, a third interface configured to communicate with at least one processing device, redirection module in communication with the first interface, the second interface and the third interface, and flow monitoring and state information module in communication with the first interface, the second interface, the third interface and the redirection module. Responsive to receipt of the packet on the first interface, the redirection module is operable to communicate with the flow monitoring and state information module whether state information exists for the packet, the state information comprising an address for a processing device. The redirection module is operable to route the packet to the processing device responsive to determining state information exists for the packet.

13 Claims, 6 Drawing Sheets

FLOW REDIRECTION EMPLOYING STATE INFORMATION

TECHNICAL FIELD

The present disclosure relates generally to packet routing.

BACKGROUND

Transparent network traffic redirection, such as in the form of WCCP (Web Cache Communication Protocol, see e.g. draft-wilson-wrec-wccp-v2, 3 Apr. 2001, available at ietf.org) has many benefits. For example, because the redirection is transparent, it is easy to deploy. The network end hosts (the client and server) do not have to be actively aware of or configured for a proxy because redirection occurs at a switch or router between the end hosts. Network traffic redirection protocols, such as WCCP allow a cluster of Traffic Processing Entities, for example WCCP Traffic Processing Entities (WTPEs), to work together to loadshare the redirected traffic. To make sure that the router always sends packets from the same Layer 4 (L4), or OSI (Open Systems Interconnection) transport layer, session to the same WTPE an agreed upon hash algorithm, or mask with value table, is used. The inputs are selectable (for example layer 3 source address, layer 3 destination address and optionally layer 3 source/destination ports, type of service (ToS), protocol, etc.) but the fields selected remain the same to ensure consistency for the entire cluster. Using consistent inputs enables multiple routers to redirect different packets of the same flow, to ensure they arrive at the same WTPE. Any member of the WCCP service group is able to determine which WTPE is supposed to get a packet by examining the packet.

While the ability to automatically loadshare new WTPEs as they enter the system is very useful, it also creates challenges. The insertion of a new WTPE will force a rebalancing of the hash buckets. When this happens, some hash buckets that were assigned to a first WTPE will now be reassigned to a second WTPE. So a flow that the router would have sent to the first WTPE is now sent to the second WTPE, even though the second WTPE has no idea about this existing flow. Because the second WTPE has no idea about the flow, the second WTPE, which may be using flow protection, will reroute the packet to the first WTPE. This approach has several problems. Troubleshooting is extremely difficult because it is unclear which WTPE is actually processing the traffic and which WTPE is merely passing through traffic. This also increases the failure surface area for a flow because the flow is subject to failure not only when the first WTPE fails, but also if the second WTPE fails, even though the second WTPE is not even processing the flow. Moreover, this leads to a waste of bandwidth on a link, a waste of routing capacity as well as wasting processing capacity of the second WTPE.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
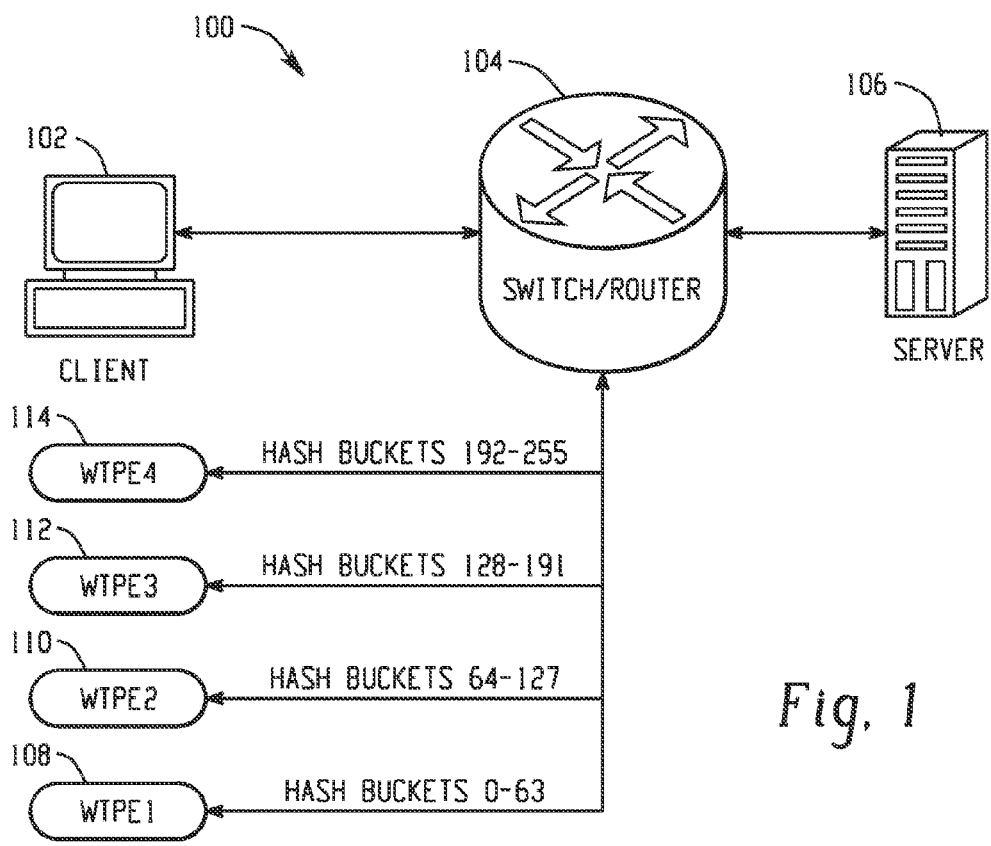
FIG. 1 illustrates an example system employing a switching/routing device configured in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus comprising a first interface configured to receive a packet from a client, a second interface configured to transmit the packet to a server, a module configured to communicate with at least one processing device, redirection module in communication with the first interface, the second interface and the module configured to communicate with at least one processing device, and flow monitoring and state information module in communication with the first interface, the module configured to communicate with at least one processing device and the redirection module. Responsive to receipt of the packet on the first interface, the redirection module is operable to communicate with the flow monitoring and state information module whether state information exists for the packet, the state information comprising an address for a processing device. The redirection module is operable to route the packet to the processing device responsive to determining state information exists for the packet.

In accordance with an example embodiment, there is disclosed herein, an apparatus comprising a first interface configured to receive a packet from a client in communication with the first interface, a second interface configured to communicate with a server and at least one processing device in communication with the second interface, redirection module in communication with the first interface and the second interface, and flow monitoring and state information module in communication with the first interface, the second interface, and the redirection module. Responsive to receipt of the packet on the first interface, the redirection module is operable to communicate with the flow monitoring and state information module to determine whether state information exists for the packet, the state information comprising an address for a processing device. The redirection module is operable to redirect the packet to the processing device responsive to determining state information exists for the packet.

In accordance with an example embodiment, there is disclosed herein, an apparatus a first interface configured to receive a packet from a client in communication with the first interface and is further configured to communicate with at least one processing device in communication with the first interface, a second interface configured to communicate with a server, redirection module in communication with the first interface and the second interface, and flow monitoring and state information module in communication with the first interface, the second interface, and the redirection module. Responsive to receipt of the packet on the first interface, the redirection module is operable to communicate with the flow monitoring and state information module to determine whether state information exists for the packet, the state information comprising an address for a processing device. The redirection module is operable to redirect the packet to the processing device responsive to determining state information exists for the packet.

In accordance with an example embodiment, there is disclosed herein, a method comprising receiving from a client a packet belonging to a flow addressed to a server and determining whether state information exists for the flow, the state information comprises an address for a processing device for the flow. The packet is redirected to the packet processing device responsive to determining state information exists for the flow.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

"Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable and/or programmed logic device, memory device containing instructions, or the like, or combinational logic embodied in hardware. Logic may also be fully embodied as software. The logic for performing a function may suitably comprise one or more modules, where a module may be part of a program that when executed performs a distinct function, or a multiplicity of functions, or a module be embodied in hardware that performs one or more distinct functions.

As used herein a flow is defined as a unidirectional sequence of packets with some common properties that pass through a network device. An image as used herein refers to a program controlling the operation of a routing or switching device.

FIG. 1 illustrates an example 100 system employing a switching/routing device (hereinafter "router") 104 configured in accordance with an example embodiment. Router 104 may suitably be any device that switches and/or routes packets between devices. A client 102 communicates with a server 106 via router 104. Client 102 may initiate a flow with server 106. Router 104 may employ one or more WTPEs, e.g. in the illustrated example WTPE1 108, WTPE2, 110, WTPE3 112 and WTPE4 114, for processing a flow between client 102 and server 106. In the illustrated example, router 104 employs a hash algorithm for determining which, if any, WTPE 108, 110, 112, 114 packets for a flow should be redirected. For example, if router 104 employs a hashing algorithm with 256 possible results (hash buckets), the hash buckets are distributed among WTPEs 108, 110, 112, 114. In the illustrated example, hash buckets 0-63 are routed to WTPE 108, hash buckets 64-127 to WTPE2 110, hash buckets 128-191 to WTPE3 112 and hash buckets 192-255 to WTPE4 114. If, however, router 104 employs a masking and value table algorithm, the value table may be allocated similarly. Although description herein describes a first, second, and in particular embodiments third interfaces, those skilled in the art should readily appreciate that this is for ease of illustration and that these interfaces may be the same interface. Moreover, the example embodiments should not be construed as limited to the number of interfaces illustrated herein as those skilled in the art should readily appreciate that any number of physically realizable interfaces may be employed.

Figure 2:
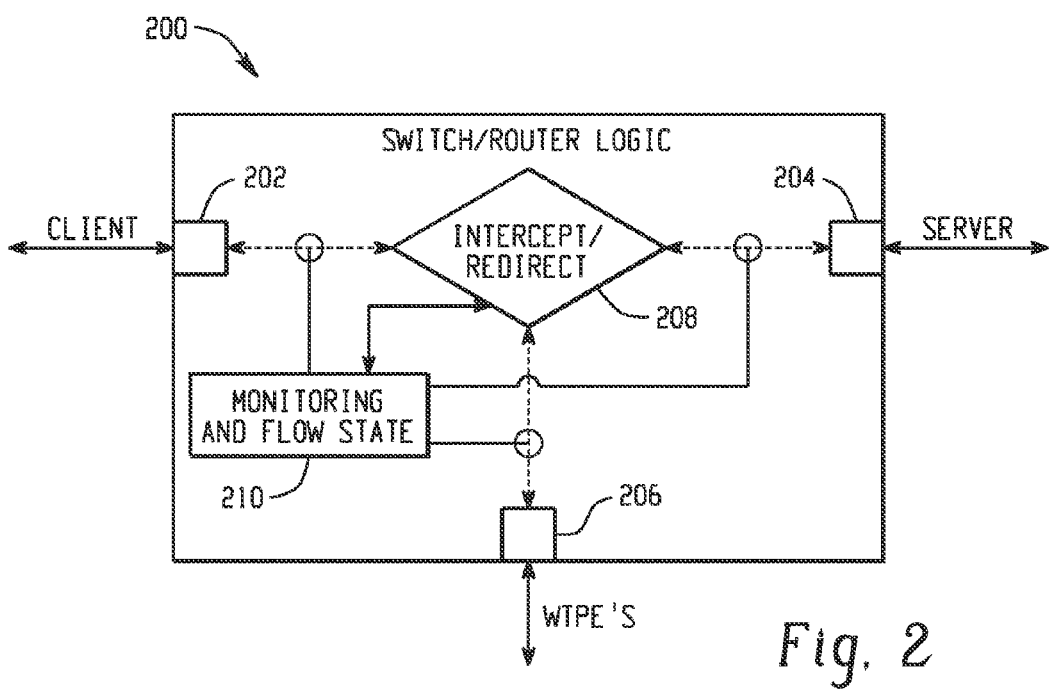
FIG. 2 is a block diagram illustrating an example of switching/routing logic configured in accordance with an example embodiment.

FIG. 2 is a block diagram illustrating an example of switching/routing logic 200 that may be employed by router 104 (FIG. 1) configured in accordance with an example embodiment.

Logic 200 comprises a first interface 202 configured to communicate with a client, e.g. client 102 (FIG. 1), a second interface 204 configured to communicate with a server, e.g. server 106 (FIG. 1) and a third interface 206 configured to communicate with at least one processing device (e.g. at least one of WTPEs 108, 110, 112, 114 in FIG. 1). The third interface may suitably comprise a module to communicate with at least one processing device. In particular embodiments, a processing device may be internal to the apparatus and a module communicates with the at least one processing device. Those skilled in the art should readily appreciate communication interfaces 202 and 204 may be bi directional in accordance with an example embodiment. Interfaces 202, 204, 206 may suitably comprise a memory for storing packet data, such as a transmit buffer and/or a receive buffer as well as physical layer (PHY) and Media Access Control (MAC) layer logic. In accordance with example embodiments, interfaces 202, 204, 206 may be physical and/or logical interfaces. As used herein, a processing device includes but is not limited to any device that may perform processing on a packet. For example, a processing device may be a cache. As another example, a processing device may be a firewall. Still another example of a processing device is a network address translator (NAT).

Logic 200 further comprises packet interception and redirection logic 208. Packet interception and redirection 208 communicates with interfaces 202, 204, 206 and redirects a packet from one interface (e.g. 202) to another interface (e.g. 206) based on a flow associated with the packet. For example, interception and redirection 208 can intercept a packet received from a client (e.g. client 102 in FIG. 1) via interface 202 intended for a server (e.g. server 106 in FIG. 1) in communication with interface 204 and if appropriate, redirects the packet to a processing device (e.g. one of WTPEs 108, 110, 112, 114 in FIG. 1) coupled to interface 206. In an example embodiment, packet interception and redirection logic 208 implements WCCP, referenced herein supra.

In an example embodiment, logic 200 further comprises flow monitoring and state information logic 210 in communication with packet interception and redirection logic 208. In an example embodiment, NETFLOW, available from Cisco Systems, Inc. 170 West Tasman Dr., San Jose, Calif. 95134 is employed to implement flow monitoring and state information logic 210. Flow monitoring and state information logic 210 is in communication with interfaces 202, 204, 206 and monitors packets entering and/or leaving interfaces 202, 204, 206. In an example embodiment, flow monitoring and state information logic 210 maintains a cache with data representative of state information for active flows. In particular embodiments, the data representative of active flows comprises data representative of a processing device to process a packet received form a client for a flow before forwarding to the server. In an example embodiment, the data representative of a processing device comprises an address for the processing device. In an example embodiment, the address may be one of a media access control (MAC) address or an Internet Protocol (IP) address. In other embodiments, the address can be any unique identifier, such as a serial number, that can be kept in the cache and converted to an actual device address.

In operation, upon receipt of the packet from a client on first interface 202, redirection logic 208 is operable to communicate with the flow monitoring and state information logic 210 to determine whether state information exists for the packet (for example has the flow the packet belongs to been initialized). In an example embodiment, the state information comprises an address for a processing device. Redirection logic 208 is operable to route the packet to the processing device (for example one of WTPE 108, 110, 112, 114 in FIG. 1) responsive to determining state information exists for the packet. If state information does not exist for the packet/flow, then redirection logic 208 performs an operation to determine the appropriate processing device for the packet. For example, for the system illustrated in FIG. 1, the appropriate processing device may be a selected one of WTPE1 108, WTPE2 110, WTPE3 112 or WTPE4 114. The packet is then redirected to the processing device. For example if layer 2 switching is employed the MAC address of the processing device is inserted into the packet, where if layer 3 routing is employed the packet may be encapsulated in another packet addressed to the processing device. Flow monitoring and state information logic 210 is updated with the address for the processing device for the flow associated with the packet. The state information is maintained until a flow is determined to be inactive or expired. For example, for a TCP (Transmission Control Protocol) flow the state information may be stored as a 'persistent' cache entry in a cache maintained by flow monitoring and state information logic 210 and is retained until a TCP FIN (no more data from sender) or TCP RST (reset the connection) packet is received. Timeouts may also be used to expire inactive cache entries.

Because the redirection logic 208 determines whether state information exists in flow monitoring and state information logic 210 for a flow before performing a hash/mask of the packet, this allows a hot insertion (or deletion) of a processing device (e.g. WTPE) without any adverse effects. For example, as will be illustrated by example herein, when a new processing device is added, current flows can retain their assignments (or stick) to their originally assigned processing device while new flows assigned to the same hash bucket may be directed to a different processing device. Similarly, if a processing device becomes unavailable for new flows (for example the device may signal it's shutting down and can't accept new flows, or the device may fail in which case communication with the device may be lost), an existing flow that is assigned to a device other than the lost device can retain its assignment (or stick) to its originally assigned processing device while new flows assigned to the same hash bucket and destined to the failed processing device may be assigned to a different processing device.

In an example embodiment, if redirection logic 208 wants to move an existing flow to a new processing device, for example due to load-sharing or failure of the existing processing device for the flow, redirection may rebalance its hash/mask table and update the state information in flow monitoring and state information logic 210 with the address of the newly assigned processing device for the flow, causing subsequent packets for the flow to be directed to the new device. Alternatively, redirection logic 208 can flush the state information from flow monitoring and state information logic 210, whereupon receipt of a subsequent packet for a flow will result in an inquiry to the new hash/mask table because no state information exists for the flow in flow monitoring and state information logic 210.

For example, referring again to FIG. 1 with continued reference to FIG. 2, a first flow is assigned to hash bucket 70. Because hash bucket 70 maps to WTPE2 110, packets for the first flow are redirected to WTPE2 110 by flow redirection logic 208 in router 104. After the first packet is redirected, state information for the flow is stored in flow monitoring and state information logic 210. The state information may be automatically populated, e.g. flow monitoring and state information logic 210 detects the packet being redirected to communication interface 206 and determines the address of the processing device (WTPE2 110) by examining the packet; or redirection logic 208 may communicate the assignment to flow monitoring and state information logic 210. If WTPE3 112 fails or for some reason cannot accept new flows (for example WTPE3 112 is operating at full capacity and cannot accept new flows, or is ready to reset but will wait until all currently assigned flows complete—for example a WTPE may reset upon receiving an updated image), then hash buckets may be reassigned as follows: hash buckets 0-84 to WTPE1 108, hash buckets 85-170 to WTPE2 110 and hash buckets 171-255 to WTPE4 114. Because state information for the first flow exists in flow monitoring and state information logic 210 the first flow continues to be directed to WTPE2 110. When packets for the first flow are received after the hash buckets have been reassigned, redirection logic 108 acquires the state information from flow monitoring and state information logic 210, which has the address for WTPE2 110 for servicing the flow, and redirects the packet to WTPE2 110. If a second, or any subsequent, flow assigned to hash bucket 70 is initialized after the hash buckets have been reassigned, the second flow will be directed to WTPE1 108, which is now assigned to hash buckets 0-84. If a flow is assigned to WTPE3 112 when WTPE3 112 fails, flow redirection logic upon determining that WTPE3 112 has failed can either flush the cache memory of flow monitoring and state information logic 210 and/or communicate updated flow assignment data to flow monitoring and state information logic 210 so that flows assigned to WTPE3 112 can be redirected to a new processing device.

As another example, if WTPE1 108 is assigned to hash buckets 0-84, WTPE2 110 is assigned hash buckets 85-170, and WTPE3 is assigned hash buckets 171-255 and a first flow belonging to hash bucket 80 is assigned to WTPE1 108, the addition of a new WTPE, WTPE4 114, can be accommodated without disrupting the current flow. For example, after WTPE 114 is added, the hash buckets can be reallocated as illustrated in FIG. 1, i.e. hash buckets 0-63 are routed to WTPE 108, hash buckets 64-127 to WTPE2 110, hash buckets 128-191 to WTPE3 112 and hash buckets 192-255 to WTPE4 114. Because in this example redirection logic 208 queries flow monitoring and state information logic 210 before querying its own hash tables, the first flow continues to be routed to WTPE1 108 even though hash bucket 80 has been reallocated to WTPE2 110. A second, or subsequent, flow for hash bucket 80 initialized after the hash buckets have been reallocated will be directed to WTPE2 110. If for some reason the first flow needs to be reassigned to another WTPE, such as WTPE2 110, redirection logic 208 may flush the state information for the flow from flow monitoring and state information logic 210 or may update the state information.

Although the descriptions herein illustrate a single interface coupled to a single client, a single interface to a single server and a single interface to an example number of processing devices, those skilled in the art should readily appreciate that the number of devices in the illustrated embodiments were selected merely for ease of illustration and that the principles described herein are suitably adaptable to any physically realizable number of interfaces, clients, servers and/or processing devices. Moreover, although the flows in the example embodiments herein are described flowing from client to server in a single direction, this also was for ease of illustration as the principles of the example embodiments described herein may also be applied to flows from a server to a client. Furthermore, although the preceding examples are directed to redirection logic that uses hash bucket assignments, those skilled in the art should readily appreciate the principles of the example embodiments described herein are suitable to be implemented in routing devices employing masking value table algorithms, or any other algorithms.

Figure 3:
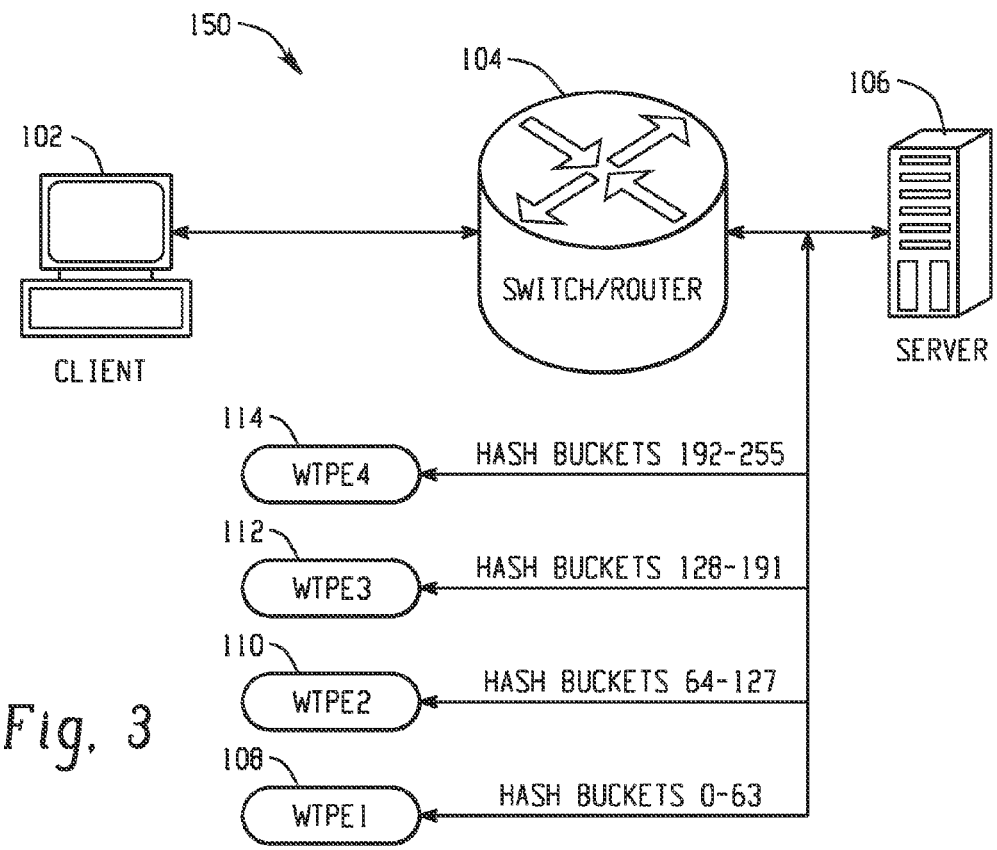
FIG. 3 illustrates an example system employing a switching/routing device configured in accordance with an example embodiment wherein processing devices are on the same segment as a server.
Figure 4:
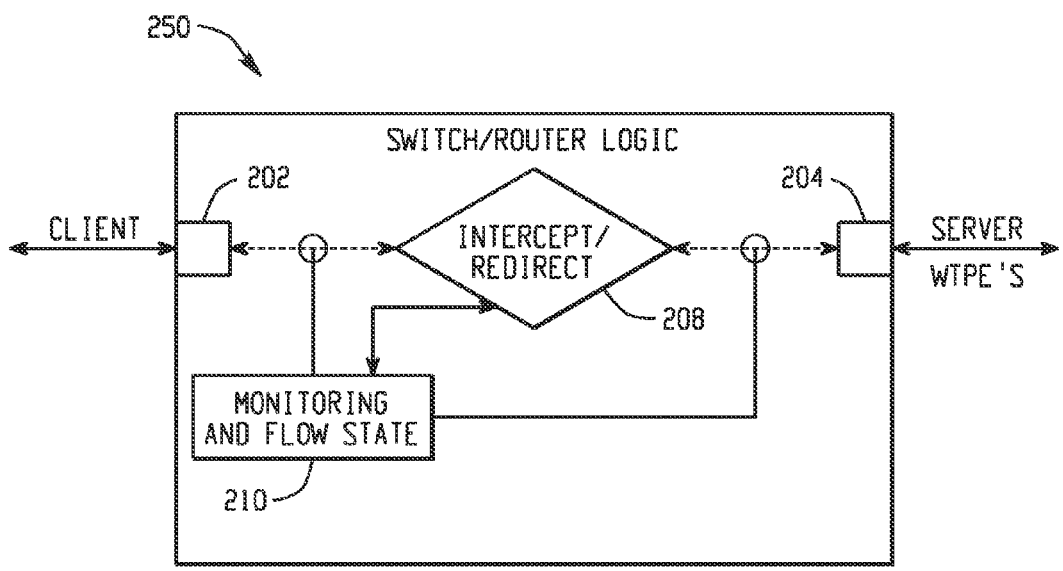
FIG. 4 is a block diagram illustrating an example of switching/routing logic configured in accordance with the example embodiment illustrated in FIG. 3.
Figure 9:
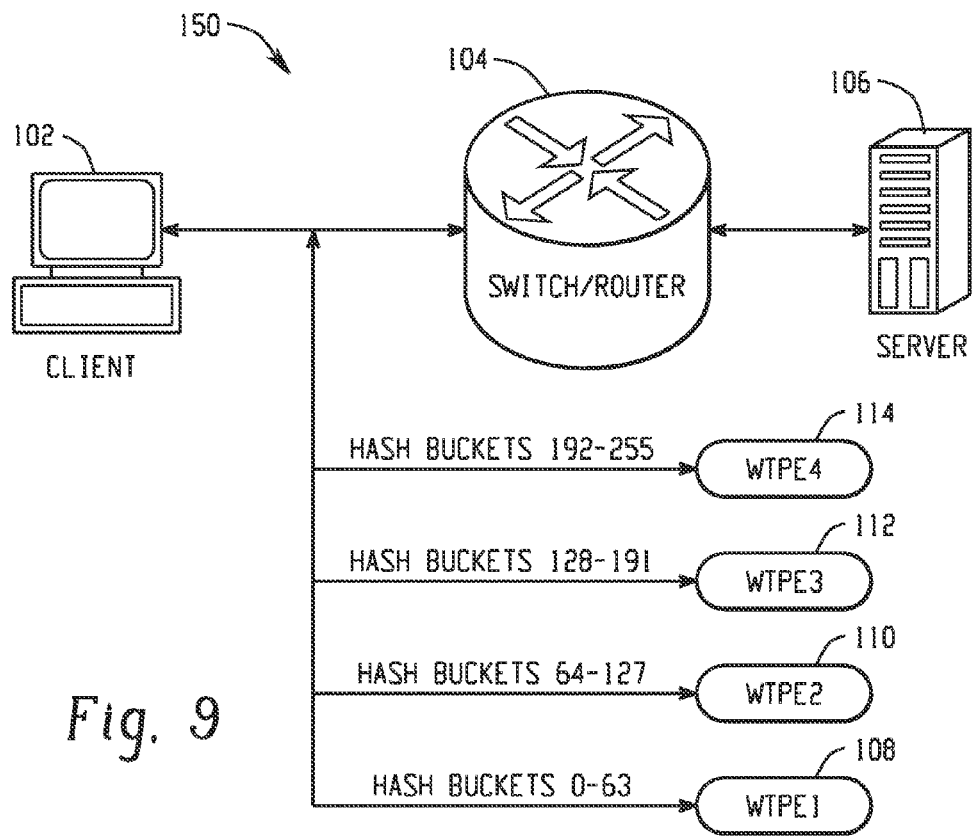
FIG. 9 illustrates an example system employing a switching/routing device configured in accordance with an example embodiment wherein processing devices are on the same segment as a client.
Figure 10:
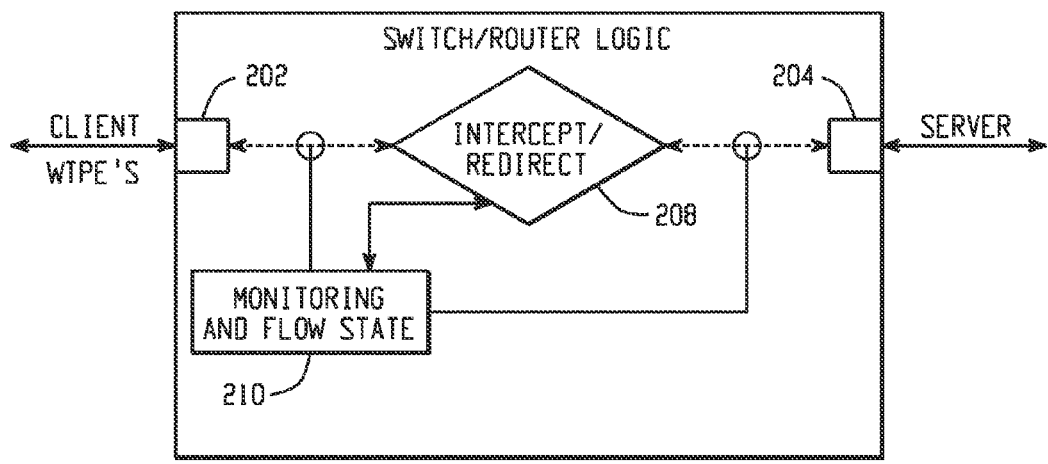
FIG. 10 is a block diagram illustrating an example of switching/routing logic configured in accordance with the example embodiment illustrated in FIG. 9.

Referring now to FIG. 3 there is illustrated an alternative embodiment 150 wherein the processing devices 108, 110, 112, 114 are coupled to the same network as server 106. FIG. 4 is a block diagram illustrating an example of switching/routing logic 250 that may be employed by router 104 (FIG. 3) configured in accordance with an example embodiment. In this embodiment, intercept/redirect logic 208 can intercept frames received on interface 202 and route them to WTPEs coupled on interface 204. As those skilled in the art can readily appreciate, processing devices may also be coupled to the same network as the client instead of (or in addition to) the same network as the server as illustrated in FIGS. 9 and 10.

Figure 5:
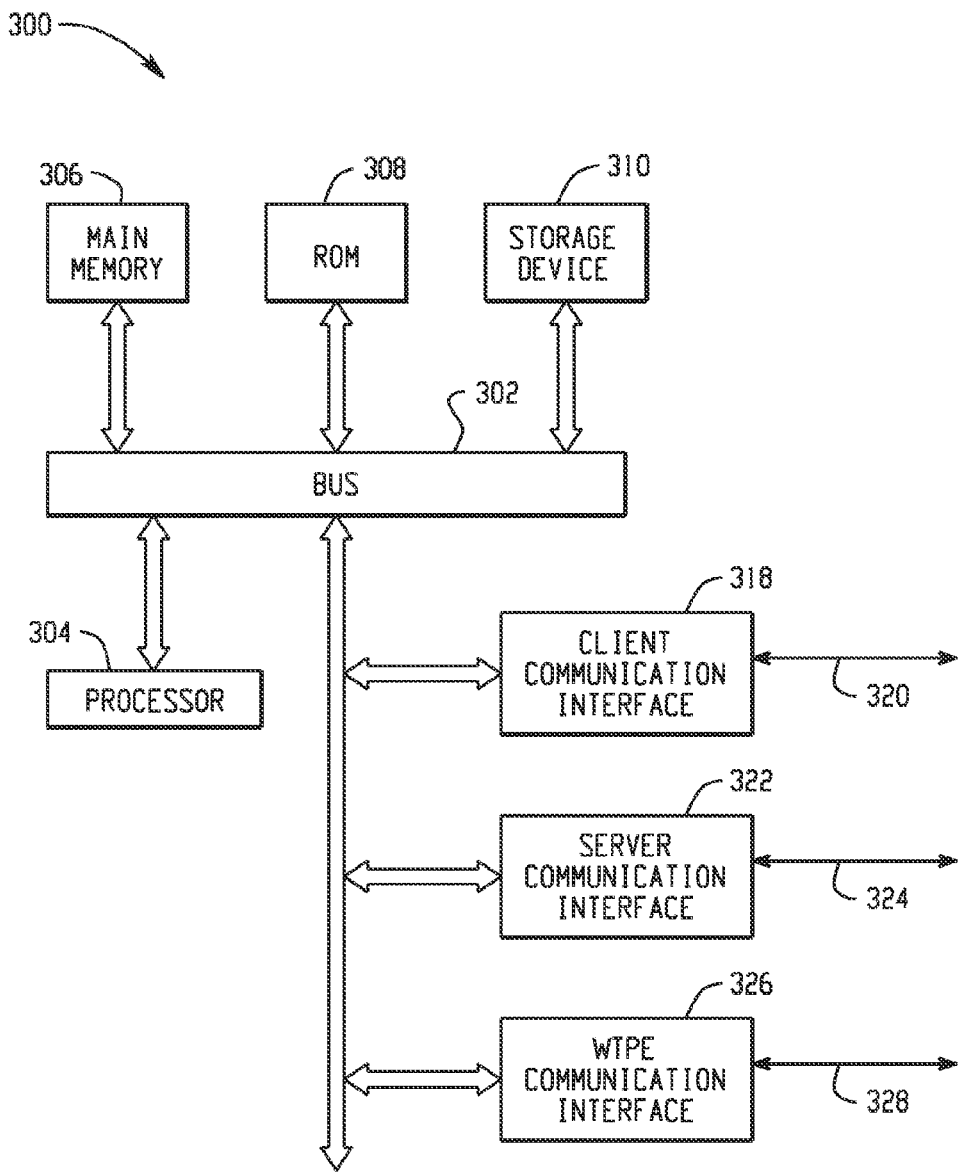
FIG. 5 is a block diagram of a computer system for implementing an example embodiment.

FIG. 5 is a block diagram of a computer system 300 upon which an example embodiment may be implemented. For example, computer system 300 may be employed to implement switch/routing logic 200 described in FIG. 2.

Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the example embodiment is related to the use of computer system 300 for flow redirection employing state information. According to an example embodiment, flow redirection employing state information is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media and volatile media. Non-volatile media include for example optical or magnetic disks, such as storage device 310. Volatile media include dynamic memory such as main memory 306. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 300 also includes communication interfaces 318, 322, 326 coupled to bus 302. Communication interfaces 318, 322, 326 provide a two-way data communication coupling computer system 300 to a client, server, and processing device respectively via link 320, 324, 328 respectively. Communication links 320, 324, 328 may employ wireless, wired and or a combination of wired and wireless links.

Figure 7:
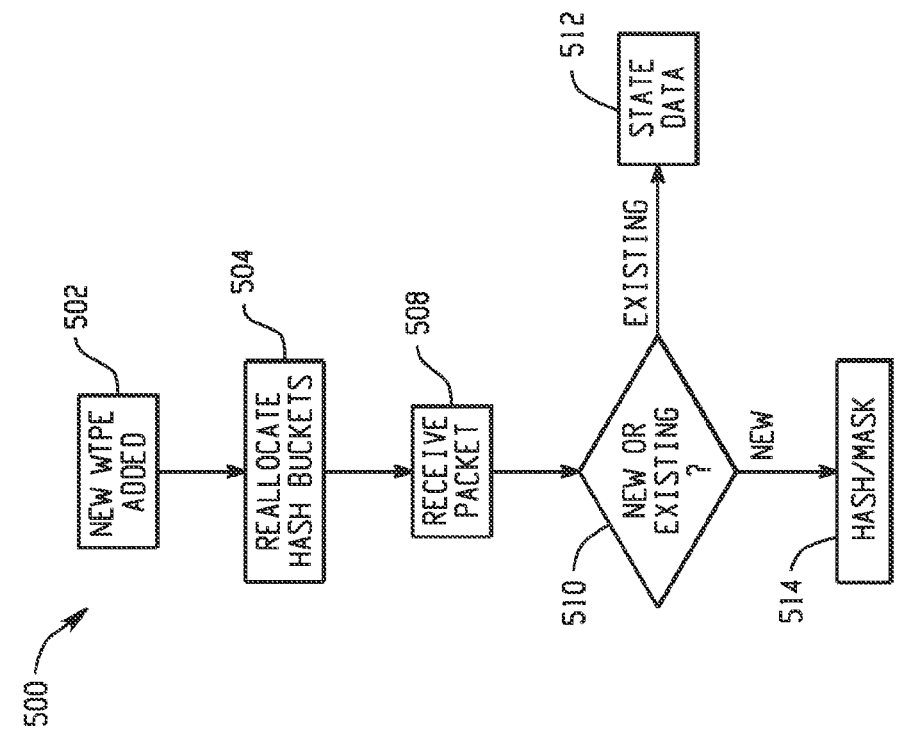
FIG. 7 is a block diagram of a methodology for reassigning flows to processing devices responsive to a new processing device being added to the system in accordance with an example embodiment.
Figure 6:
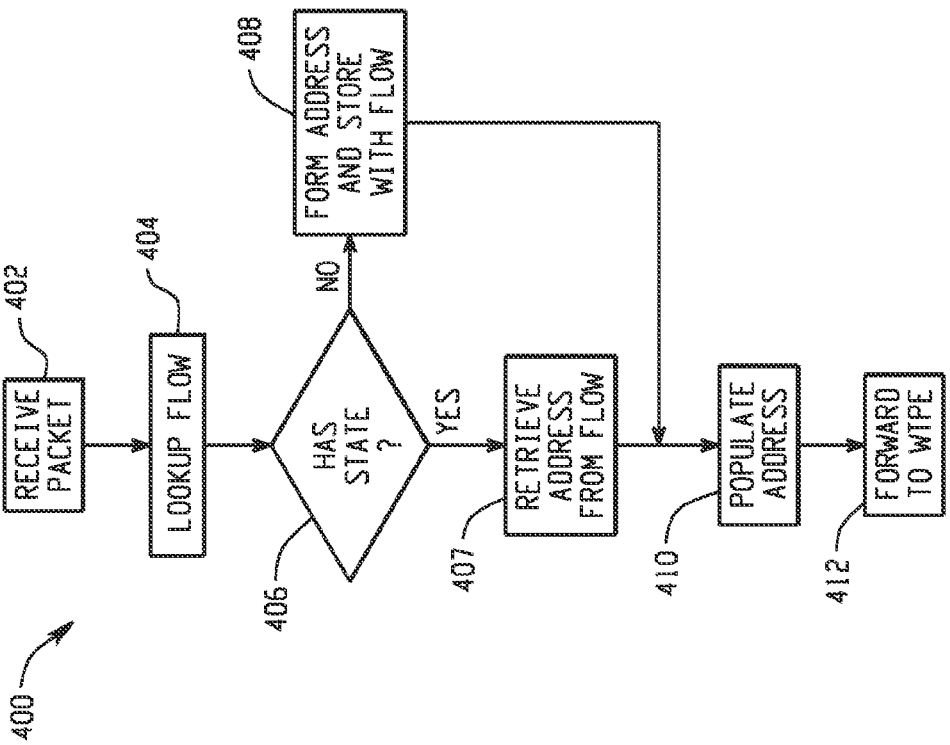
FIG. 6 is a block diagram of a methodology for routing packets to the correct processing device in accordance with an example embodiment.
Figure 8:
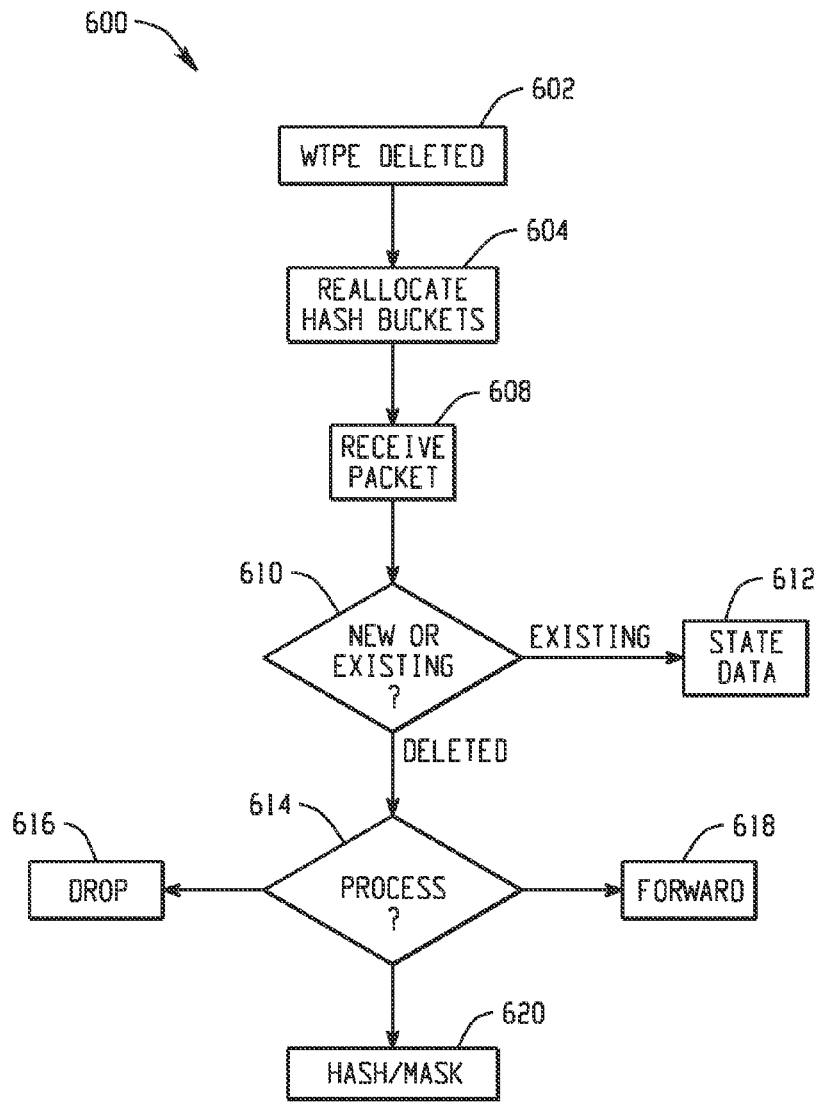
FIG. 8 is a block diagram of a methodology for handling packet flows responsive to the shutting down and/or failure of a processing device.

In view of the foregoing structural and functional features described above, methodologies in accordance with example embodiments will be better appreciated with reference to FIGS. 6-8. While, for purposes of simplicity of explanation, the methodologies of FIGS. 6-8 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement a methodology in accordance with an aspect the example embodiment. The methodologies described herein are suitably adapted to be implemented in hardware, software, or a combination thereof.

FIG. 6 is a block diagram of a methodology 400 for routing packets in accordance with an example embodiment. Methodology 400 allows for transparent redirection which can accommodate load sharing by ensuring stickiness of redirection data. In an example embodiment, methodology 400 is performed by redirection logic associated with a switching/routing device between a client and a server.

At 402, a packet belonging to a flow and addressed to the server is received from the client. The packet may suitably comprise data representative of a source address, destination address, source port, destination port, type of service (ToS) and/or protocol. The flow may be identified by a unique combination of data representative of a source address, destination address, source port, destination port, type of service (ToS) and/or protocol, or any other packet fields.

At 404, a lookup is performed to acquire state information for the flow. In an example embodiment the state information comprises an address for a processing device for the flow. The state information may be acquired from a state information cache associated with flow monitoring and state information logic 210 as described herein.

If at 406, state information for the flow was not found (NO), an operation such as a hash or mask is performed on the flow to determine an address for a processing device for the flow as illustrated at 407. Initialization of the processing device with the flow may also be performed. If, at 406, state information was found, (YES) the address of the processing device is acquired from the state information as illustrated at 407.

At 410, an address field for forwarding the packet is populated. The address may be the address obtained from a hash/mask of the flow data obtained at 408 responsive to not finding state data for a flow, or the address may be populated with state information data. In an example embodiment, the address for the processing device is a MAC address which is inserted into the packet. In another example embodiment, the address for the processing device is an IP address, and the packet is encapsulated with an IP header addressed to the IP address of the processing device.

At 410, the packet is redirected to the processing device, such as a WTPE, found at 407 or at 408. If the packet is a first packet for a flow, for example the address was obtained at 408, the state information for the flow associated with the packet is stored and subsequent packets will have their address fields populated with the existing state information, instead of by a hash/mask of the flow data.

For example, when the first packet for a new flow is received at 402, a lookup of the flow associated with the packet at 404 will return no state information. Since at 406 a determination is made that no state information was found at 404 (NO), at 408 an address for redirecting the packet is obtained, such as by a hash/mask of the flow. This address is stored in the corresponding entry in the flow state cache, 210. The address is inserted into the first packet at 410 and the packet is routed at 412. When a second or subsequent packet is received at 402, a lookup for the flow is performed at 404. At 406, because state information for the flow exists (YES), the address associated with the state information is retrieved from the cache at 407 and populated into the packet at 410. At 412 the second or subsequent packet is redirected to the address of the processing device.

FIG. 7 is a block diagram of a methodology 500 for reassigning flows to processing devices responsive to a new processing device being added to the system in accordance with an example embodiment. At 502, the new processing device, such as a WTPE, is detected. At 504, in response to detecting the new processing device, hash buckets (or table values for a mask) are reallocated.

At 508 a packet is received for a flow that has been reassigned to another processing device (for example new WTPE) during the reallocation at 504. At 510 it is determined if state information exists for the flow. If at 510 a determination is made that the packet received at 508 is for an existing flow (EXISTING), state information for the existing flow is used and the packet is routed to the processing device that was previously assigned to process the flow based on the state information as illustrated at 512, even if the hash bucket/table value has been changed to another processing device. If at 510 it is determined that the packet is for a new flow (NEW), then a hash/mask of the packet is performed as illustrated at 514 and the packet is routed to the processing device currently assigned to process the reallocated hash bucket/table value. Thus, from the foregoing existing flows are not disrupted by changes to hash buckets or table values and continue to be processed by the processing device originally selected to process the flow, while new flows are directed to newly assigned processing devices. In accordance with an example embodiment, if an existing flow is to be moved to another processing device, the state information can be updated or flushed.

FIG. 8 is a block diagram of a methodology 600 for handling packet flows responsive to the shutting down and/or failure of a processing device. in accordance with an example embodiment. At 602, a processing device, such as a WTPE, is deleted. For example, a processing device may be no longer able to accept new flows because it is operating at capacity, or needs to restart (for example after receiving a new image); or communications with the processing device may have been lost (device failure). At 604, in response to deleting a processing device, hash buckets (or table values for a mask) are reallocated.

At 608 a packet is received. At 610 it is determined if state information exists for the flow for the packet. If at 610 a determination is made that the packet received at 608 is for an existing WTPE (EXISTING). The packet is routed to the processing device that was previously assigned to process the flow based on the state information as illustrated at 612, even if the hash bucket/table value has been changed to another processing device.

If at 610 it is determined that the packet is for a flow that was being processed by the deleted WTPE (DELETED), at 614 a decision is made on how to process the packet. For example, at 616 the packet may be dropped. As another example, the packet may be forwarded to the server without any processing as illustrated at 618. Still another alternative is that the flow may be reassigned to a new WTPE. If the flow is assigned to a new WTPE then a hash/mask of the packet is performed as illustrated at 620 and the packet is routed to the processing device currently assigned to process the reallocated hash bucket/table value. Thus, from the foregoing flows being processed by WTPEs that were not deleted are not disrupted by changes to hash buckets or table values and continue to be processed by the processing device originally selected to process the flow, while flows that were assigned to a deleted WTPE can be handled accordingly.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
    a first interface configured to receive a packet associated with a first flow from a client in communication with the first interface;
    a second interface configured to transmit the packet to a server in communication with the second interface;
    a module configured to communicate with at least one processing device;
    a redirection module in communication with the first interface, the second interface and the module configured to communicate with at least one processing device; and
    a flow monitoring and state information module in communication with the first interface, the second interface, the module configured to communicate with at least one processing device, and the redirection module;
    wherein responsive to receipt of the packet on the first interface, the redirection module is operable to communicate with the flow monitoring and state information module to determine whether state information exists for the packet, the state information comprising an address for a processing device;

wherein the redirection module is operable to employ a hashing algorithm employing a predetermined number of hash buckets, wherein the predetermined number of hash buckets are distributed among the at least one processing device;

wherein the redirection module employs the hashing algorithm to associate the first flow with a first hash bucket that is associated with a first of the at least one processing device;

wherein the redirection module reallocates the predetermined number of hash buckets responsive to determining a new processing device has been added to at the least one processing device, the first hash bucket being associated with the second of the at least one processing device responsive to the redirection module reallocating the predetermined number of hash buckets;

wherein the redirection module employs the hashing algorithm to associate a second flow with the first hash bucket after the first hash bucket has been reallocated to the second processing device; and wherein the redirection module continues to associate the first flow with the first processing device, and the second flow is associated with the second processing device.

2. The apparatus set forth in claim 1, wherein the redirection module is operable to determine from a hash table an assigned processing device selected from the at least one processing device for the packet;

wherein the redirection module is operable to update the flow monitoring and state information module with the address for first processing device; and wherein the redirection module is operable to route the packet to the first processing device.

3. The apparatus set forth in claim 2, wherein the address for the first processing device is a Media Access Control (MAC) address.

4. The apparatus set forth in claim 2, wherein the address for the first processing device is an Internet Protocol (IP) address.

5. The apparatus set forth in claim 1,
wherein the redirection module is operable to update the flow monitoring and state information module with the address for the first processing device; and
wherein the redirection module is operable to route the packet to the first processing device.

6. The apparatus set forth in claim 1, wherein the redirection module is operable to update the flow monitoring and state information module responsive to reassigning an existing flow.

7. The apparatus set forth in claim 1, wherein the packet comprises data representative of a flow comprising a source address, a source port, a destination address and a destination port; and
wherein the redirection module is operable to determine whether state information exists for the packet based on the data representative of the flow.

8. A method, comprising:
receiving a packet from a client belonging to a first flow;
determining whether state information exists for the first flow, the state information comprises an address for a processing device for the flow;
selecting a selected hash bucket for the first flow response to determining state information does not exist for the first flow, selecting the first flow comprises employing a hashing algorithm employing a predetermined number of hash buckets, wherein the predetermined number of hash buckets are distributed among a plurality of processing devices;

reallocating the predetermined number of hash buckets responsive to determining a processing device has been removed from the plurality of processing devices, wherein the selected hash bucket is associated with a second processing device responsive to reallocating the predetermined number of hash buckets;

associating a second flow with the second processing device associated with selected hash bucket after the selected hash bucket has been reallocated to the second processing device; and wherein the first flow continues to be associated with the first processing device, and the second flow is associated with the second processing device.

9. The method according to claim 8, further comprising:
determining an address for a first processing device for the first flow,
storing the address with flow information for the first flow, and
routing the first packet to the processing device; further comprising
receiving a subsequent packet for the first flow after determining an address for a processing device for the flow, the determining whether state information exists for the flow further comprises retrieving the previously determined address of the processing device responsive to determining state information exists for the flow, and the subsequent packet is redirected to the to the address of the first processing device.

10. The method according to claim 9, wherein the address for the first processing device is selected from the group consisting of a media access control (MAC) address and an internet protocol (IP) address.

11. An apparatus, comprising:
a first interface configured to receive a packet from a client;
a second interface configured to communicate with a server and at least one processing device;
a redirection module configured to communicate with the first interface; and
a flow monitoring and state information module configured to communicate with the first interface, and the redirection module;

wherein responsive to receipt of the packet associated with a first flow on the first interface, the redirection module is operable to communicate with the flow monitoring and state information module to determine whether state information exists for the packet, the state information comprising an address for a processing device; and wherein the redirection module is operable to employ a hashing algorithm employing a predetermined number of hash buckets wherein the predetermined number of hash buckets are distributed among the at least one processing device;

wherein the redirection module employs the hashing algorithm to associate the first flow with a first hash bucket that is associated with a first of the at least one processing device;

wherein the redirection module reallocates the predetermined number of hash buckets responsive to determining a second processing device has been added to at the least one processing device, the first hash bucket being associated with the second of the at least one processing device responsive to the redirection module reallocating the predetermined number of hash buckets;

wherein the redirection module employs the hashing algorithm to associate a second flow with the first hash bucket after the first hash bucket has been reallocated to the second processing device; and wherein the redirection module continues to associate the first flow with the first processing device, and the second flow is associated with the second processing device.

12. An apparatus, comprising:

a first interface configured to receive a packet from a client in communication with the first interface and is further configured to communicate with a plurality of processing devices in communication with the first interface;

a second interface configured to communicate with a server;

redirection module in communication with the first interface and the second interface; and flow monitoring and state information module in communication with the first interface, the second interface, and the redirection module;

wherein responsive to receipt of a first packet associated with a first on the first interface, the redirection module is operable to communicate with the flow monitoring and state information module to determine whether state information exists for the first flow, the state information comprising an address for a processing device; and wherein the redirection module is operable to employ a hashing algorithm a hashing algorithm employing a predetermined number of hash buckets, wherein the predetermined number of hash buckets are distributed among the plurality of processing devices responsive to determining state information does not exist for the first flow;

wherein the redirection module employs the hashing algorithm to associate the first flow with a first hash bucket that is associated with a first of the at least one processing device;

wherein the redirection module reallocates the predetermined number of hash buckets responsive to determining a processing device has been removed from the plurality of processing devices, the first hash bucket being associated with a second of the plurality of processing devices responsive to the redirection module reallocating the predetermined number of hash buckets;

wherein the redirection module employs the hashing algorithm to associate a second flow with the first hash bucket after the first hash bucket has been reallocated to the second processing device; and wherein the redirection module continues to associate the first flow with the first processing device, and the second flow is associated with the second processing device.

13. Logic encoded in at least one non-transitory tangible media, and when executed operable to:

receive a first packet belonging to a first flow;

determine that state information does not exist for the flow responsive to receiving the first packet;

determine an address for selecting a first processing device from a plurality of processing devices for the flow, wherein determining the address employs a hashing algorithm that employs a predetermined number of hash buckets distributed among the plurality of processing devices, the first processing device being associated with a selected bucket selected from the predetermined number of hash buckets;

storing the address of the first processing device with the flow information, and routing the first packet to the processing device;

reallocate the predetermined number of hash buckets responsive to determining a second processing device has been added to at the plurality of processing devices, the selected hash bucket being associated with the second processing device responsive to reallocating the predetermined number of hash buckets;

receive a second packet for a first flow, the second packet being received after the first hash bucket has been reallocated;

determine that state information exists for the flow responsive to receiving the second packet;

redirect the second packet to the first packet processing device responsive to determining state information exists for the flow;

receive a packet associated with a second flow, after the first hash bucket has been reallocated to the second processing device, the second flow is not assigned a processing device; and assign the second flow to the second processing device responsive to the hashing algorithm associating the second flow with the selected hash bucket.

* * * * *